US012775278B2

(12) United States Patent
Rimer

(10) Patent No.: US 12,775,278 B2
(45) Date of Patent: Oct. 27, 2026

(54) AUTONOMOUS ROBOTIC OPERATION OF EQUIPMENT AND VEHICLES

(71) Applicant: Textron Inc., Providence, RI (US)

(72) Inventor: Shayne Evan Rimer, North Augusta, SC (US)

(73) Assignee: TEXTRON INNOVATIONS INC., Providence, RI (US)

( * ) Notice: Subject to any disclaimer, the term of this patent is extended or adjusted under 35 U.S.C. 154(b) by 98 days.

(21) Appl. No.: 18/884,347

(22) Filed: Sep. 13, 2024

(65) Prior Publication Data

US 2026/0079489 A1 Mar. 19, 2026

(51) Int. Cl.
*G05D 1/228* (2024.01)

(52) U.S. Cl.
CPC .................................... *G05D 1/228* (2024.01)

(58) Field of Classification Search
CPC ..................................................... G05D 1/228
See application file for complete search history.

(56) References Cited

U.S. PATENT DOCUMENTS 5,448,479 A 9/1995 Kemner et al.
5,917,405 A 6/1999 Joao
6,346,876 B1 2/2002 Flick
6,748,536 B1 6/2004 Madau
6,756,885 B1 6/2004 Flick
7,224,083 B2 5/2007 Flick
7,853,367 B2 12/2010 Higashi
8,737,913 B2 5/2014 Xiao et al.
8,768,565 B2 7/2014 Jefferies et al.
8,874,282 B2 10/2014 Fredriksson
9,002,536 B2 4/2015 Hatton
9,571,284 B2 2/2017 Leboeuf et al.
9,754,431 B2 9/2017 Sigal et al.
9,808,730 B2 11/2017 Jenkins et al.
9,865,113 B2 1/2018 Maiwand et al.
10,101,738 B2 10/2018 Kaspersky et al.
10,106,106 B2 10/2018 Haggerty et al.
10,249,182 B1 4/2019 Turner et al.
(Continued)

FOREIGN PATENT DOCUMENTS

KR 20250051842 A * 4/2025 ............. G10L 15/26

OTHER PUBLICATIONS

Shim etal, KR20250051842A, EPO machine translation (Year: 2025).*

*Primary Examiner* — Yuen Wong
(74) *Attorney, Agent, or Firm* — Foley & Lardner LLP

(57) ABSTRACT

A robotic system includes a movement system configured to move the robotic system between physical locations. The robotic system further includes at least one interaction interface configured to physically interact with operator controls of a vehicle. The robotic system further includes at least one processing circuit having at least one processor and at least one memory having instructions stored thereon that, when executed by the at least one processor, cause the at least one processor to: receive a command to perform a task using the vehicle; acquire vehicle information associated with the vehicle via a wireless connection with at least one of the vehicle or an external system; determine how to operate the vehicle using the operator controls based on the vehicle information; and engage the operator controls using the at least one interaction interface to operate the vehicle to perform the task.

14 Claims, 9 Drawing Sheets

(56) References Cited

U.S. PATENT DOCUMENTS

| | | | |
|---|---|---|---|
| 10,965,450 | B2 | 3/2021 | Alfred et al. |
| 10,977,930 | B2 | 4/2021 | Tieman |
| 2002/0116117 | A1 | 8/2002 | Martens et al. |
| 2006/0025272 | A1 | 2/2006 | Pelouch |
| 2006/0061458 | A1 | 3/2006 | Simon et al. |
| 2007/0288127 | A1 | 12/2007 | Haq et al. |
| 2008/0122594 | A1 | 5/2008 | Brecht et al. |
| 2010/0313017 | A1 | 12/2010 | Stã&Hlin |
| 2010/0321173 | A1 | 12/2010 | Magner et al. |
| 2010/0332073 | A1 | 12/2010 | Mathieson et al. |
| 2014/0172188 | A1 | 6/2014 | Sella et al. |
| 2015/0045013 | A1 | 2/2015 | Simmons |
| 2015/0100782 | A1 | 4/2015 | Gautama et al. |
| 2015/0100783 | A1 | 4/2015 | Gautama et al. |
| 2015/0301526 | A1 | 10/2015 | Tjandra |
| 2017/0236343 | A1 | 8/2017 | Leboeuf et al. |
| 2017/0352215 | A1 | 12/2017 | Maiwand et al. |
| 2018/0009416 | A1 | 1/2018 | Maiwand et al. |
| 2018/0103036 | A1 | 4/2018 | Fox et al. |
| 2018/0212780 | A1 | 7/2018 | Talamonti et al. |
| 2018/0270052 | A1 | 9/2018 | Cullen |
| 2018/0326947 | A1 | 11/2018 | Oesterling et al. |
| 2019/0092280 | A1 | 3/2019 | Oesterling et al. |
| 2019/0143937 | A1 | 5/2019 | Hatton et al. |
| 2019/0253262 | A1 | 8/2019 | Smith et al. |
| 2019/0371176 | A1 | 12/2019 | Montemurro et al. |
| 2020/0219383 | A1 | 7/2020 | Tieman |
| 2020/0249693 | A1 | 8/2020 | Hamilton et al. |
| 2021/0234767 | A1 | 7/2021 | Ricci et al. |
| 2021/0312723 | A1 | 10/2021 | Santos et al. |
| 2022/0109662 | A1 | 4/2022 | Jenkins et al. |
| 2023/0319530 | A1 | 10/2023 | Ikushima |

* cited by examiner

AUTONOMOUS ROBOTIC OPERATION OF EQUIPMENT AND VEHICLES

BACKGROUND

The field of robotics may be subdivided into autonomous systems (e.g., robots) that operate within an environment specifically designed for the robot and autonomous systems that are specially designed to operate within the existing environment as it is designed for humans. Autonomous systems within this second class require information about the environment and the objects they are interacting with. Some of this information may be perceived by the robot itself through sensors, observation, and the collection of data.

SUMMARY

One embodiment relates to a robotic system. The robotic system includes a movement system configured to move the robotic system between physical locations. The robotic system further includes at least one interaction interface configured to physically interact with operator controls of a vehicle. The robotic system further includes at least one processing circuit having at least one processor and at least one memory having instructions stored thereon that, when executed by the at least one processor, cause the at least one processor to receive a command to perform a task using the vehicle. The instructions, when executed by the at least one processor, further cause the at least one processor to acquire vehicle information associated with the vehicle via a wireless connection with at least one of the vehicle or an external system. The instructions, when executed by the at least one processor, further cause the at least one processor to determine how to operate the vehicle using the operator controls based on the vehicle information. The instructions, when executed by the at least one processor, further cause the at least one processor to engage the operator controls using the at least one interaction interface to operate the vehicle to perform the task.

Another embodiment relates to a robotic system. The robotic system includes a movement system configured to move the robotic system between physical locations. The robotic system further includes at least one interaction interface configured to physically interact with operator controls of a piece of equipment. The robotic system further includes at least one processing circuit having at least one processor and at least one memory having instructions stored thereon that, when executed by the at least one processor, cause the at least one processor to receive a command to perform a task using the piece of equipment. The instructions, when executed by the at least one processor, further cause the at least one processor to receive equipment information associated with the piece of equipment via a wireless connection with at least one of the piece of equipment or an external system. The instructions, when executed by the at least one processor, further cause the at least one processor to determine how to operate the piece of equipment using the operator controls based on the equipment information. The instructions, when executed by the at least one processor, further cause the at least one processor to engage the operator controls using the at least one interaction interface to operate the piece of equipment to perform the task.

Still another embodiment relates to a method for autonomously operating a vehicle using a robotic system. The method includes receiving, by a robotic system, a command to perform a task using a vehicle having operator controls. The method further includes acquiring, by the robotic system, vehicle information associated with the vehicle via a wireless connection with at least one of the vehicle or an external system. The method further includes determining, by the robotic system, how to operate the vehicle using the operator controls based on the vehicle information. The method further includes engaging, by the robotic system, the operator controls using at least one interaction interface to operate the vehicle to perform the task.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

DETAILED DESCRIPTION

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

Overall Vehicle—Golf Cart

Figure 1:
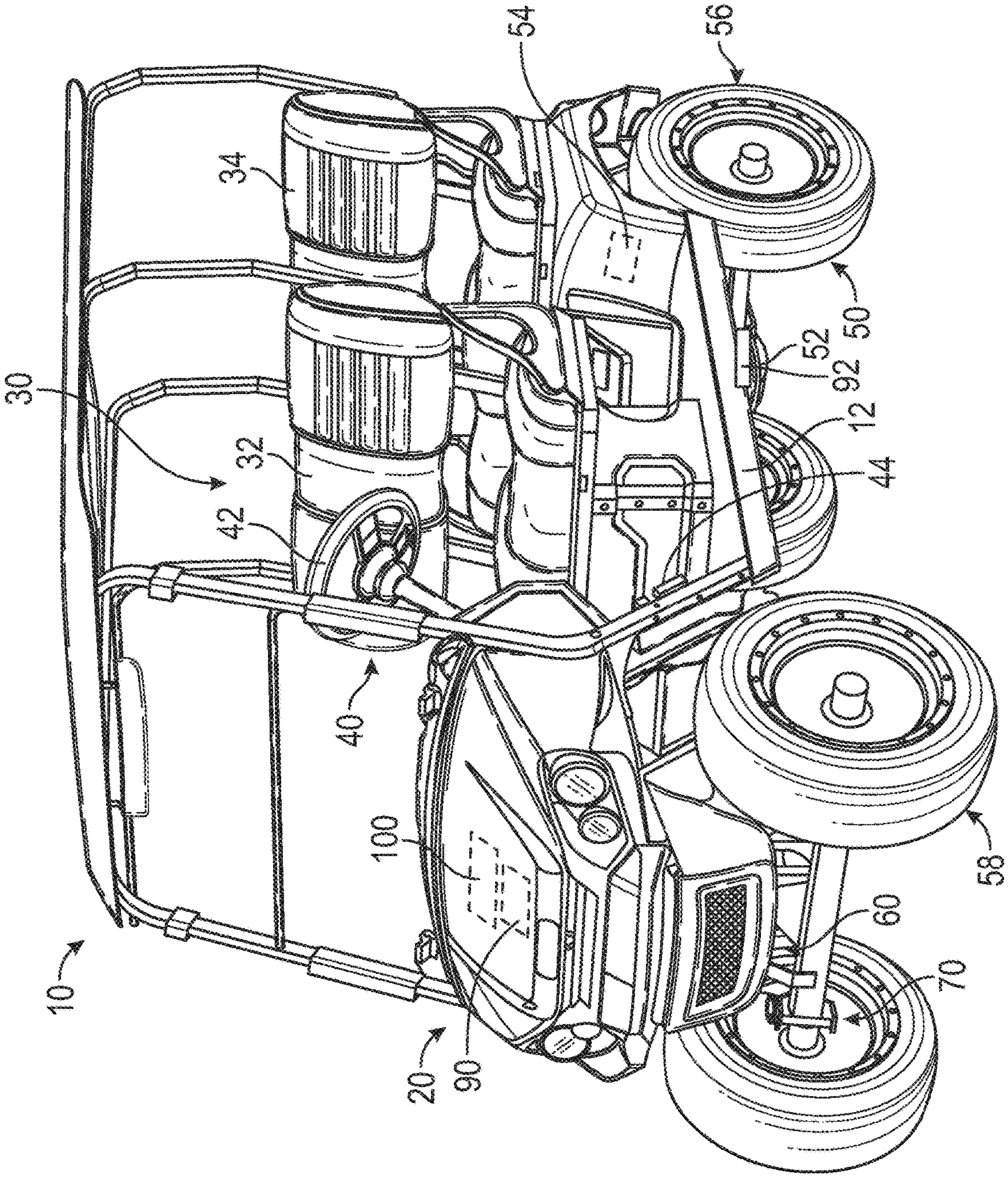
FIG. 1 is a perspective view of a vehicle, according to an exemplary embodiment.
Figure 2:
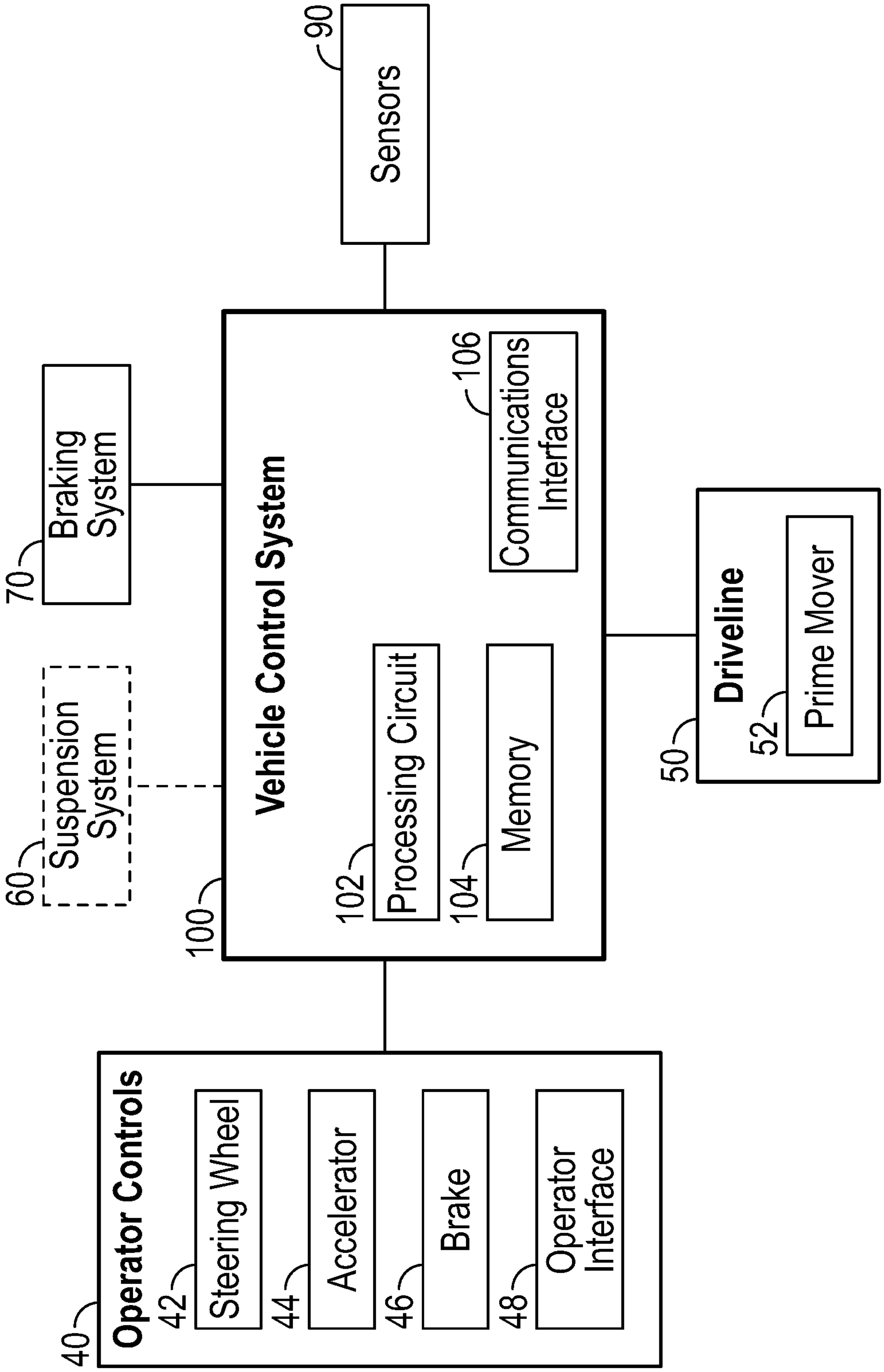
FIG. 2 is a schematic block diagram of the vehicle of FIG. 1, according to an exemplary embodiment.

As shown in FIGS. 1 and 2, a machine or vehicle, shown as vehicle 10, includes a chassis, shown as frame 12; a body assembly, shown as body 20, coupled to the frame 12 and having an occupant portion or section, shown as occupant seating area 30; operator input and output devices, shown as operator controls 40, that are disposed within the occupant seating area 30; a drivetrain, shown as driveline 50, coupled to the frame 12 and at least partially disposed under the body 20; a vehicle suspension system, shown as suspension system 60, coupled to the frame 12 and one or more components of the driveline 50; a vehicle braking system, shown as braking system 70, coupled to one or more components of the driveline 50 to facilitate selectively braking the one or more components of the driveline 50; one or more first sensors, shown as sensors 90; and a control system, shown as vehicle control system 100, coupled to the operator controls 40, the driveline 50, the suspension system 60, the braking system 70, and the sensors 90. In some embodiments, the vehicle 10 includes more or fewer components.

According to an exemplary embodiment, the vehicle 10 is an off-road machine or vehicle. In some embodiments, the off-road machine or vehicle is a lightweight or recreational machine or vehicle such as a golf cart, an all-terrain vehicle ("ATV"), a utility task vehicle ("UTV"), a low speed vehicle ("LSV"), a personal transport vehicle ("PTV"), and/or another type of lightweight or recreational machine or vehicle. In some embodiments, the off-road machine or vehicle is a chore product such as a lawnmower, a turf mower, a push mower, a ride-on mower, a stand-on mower, aerator, turf sprayers, bunker rake, and/or another type of chore product (e.g., that may be used on a golf course).

According to the exemplary embodiment shown in FIG. 1, the occupant seating area 30 includes a plurality of rows of seating including a first row of seating, shown as front row seating 32, and a second row of seating, shown as rear row seating 34. In some embodiments, the occupant seating area 30 includes a third row of seating or intermediate/middle row seating positioned between the front row seating 32 and the rear row seating 34. According to the exemplary embodiment shown in FIG. 1, the rear row seating 34 is facing forward. In some embodiments, the rear row seating 34 is facing rearward. In some embodiments, the occupant seating area 30 does not include the rear row seating 34. In some embodiments, in addition to or in place of the rear row seating 34, the vehicle 10 includes one or more rear accessories. Such rear accessories may include a golf bag rack, a bed, a cargo body (e.g., for a drink cart), and/or other rear accessories.

According to an exemplary embodiment, the operator controls 40 are configured to provide an operator with the ability to control one or more functions of and/or provide commands to the vehicle 10 and the components thereof (e.g., turn on, turn off, drive, turn, brake, engage various operating modes, raise/lower an implement, etc.). As shown in FIGS. 1 and 2, the operator controls 40 include a steering interface (e.g., a steering wheel, joystick(s), etc.), shown steering wheel 42, an accelerator interface (e.g., a pedal, a throttle, etc.), shown as accelerator 44, a braking interface (e.g., a pedal), shown as brake 46, and one or more additional interfaces, shown as operator interface 48. The operator interface 48 may include one or more displays and one or more input devices. The one or more displays may be or include a touchscreen, a LCD display, a LED display, a speedometer, gauges, warning lights, etc. The one or more input device may be or include buttons, switches, knobs, levers, dials, etc.

According to an exemplary embodiment, the driveline 50 is configured to propel the vehicle 10. As shown in FIGS. 1 and 2, the driveline 50 includes a primary driver, shown as prime mover 52, an energy storage device, shown as energy storage 54, a first tractive assembly (e.g., axles, wheels, tracks, differentials, etc.), shown as rear tractive assembly 56, and a second tractive assembly (e.g., axles, wheels, tracks, differentials, etc.), shown as front tractive assembly 58. In some embodiments, the driveline 50 is a conventional driveline whereby the prime mover 52 is an internal combustion engine and the energy storage 54 is a fuel tank. The internal combustion engine may be a spark-ignition internal combustion engine or a compression-ignition internal combustion engine that may use any suitable fuel type (e.g., diesel, ethanol, gasoline, natural gas, propane, etc.). In some embodiments, the driveline 50 is an electric driveline whereby the prime mover 52 is an electric motor and the energy storage 54 is a battery system. In some embodiments, the driveline 50 is a fuel cell electric driveline whereby the prime mover 52 is an electric motor and the energy storage 54 is a fuel cell (e.g., that stores hydrogen, that produces electricity from the hydrogen, etc.). In some embodiments, the driveline 50 is a hybrid driveline whereby (i) the prime mover 52 includes an internal combustion engine and an electric motor/generator and (ii) the energy storage 54 includes a fuel tank and/or a battery system. According to the exemplary embodiment shown in FIG. 1, the rear tractive assembly 56 includes rear tractive elements and the front tractive assembly 58 includes front tractive elements that are configured as wheels. In some embodiments, the rear tractive elements and/or the front tractive elements are configured as tracks.

According to an exemplary embodiment, the prime mover 52 is configured to provide power to drive the rear tractive assembly 56 and/or the front tractive assembly 58 (e.g., to provide front-wheel drive, rear-wheel drive, four-wheel drive, and/or all-wheel drive operations). In some embodiments, the driveline 50 includes a transmission device (e.g., a gearbox, a continuous variable transmission ("CVT"), etc.) positioned between (a) the prime mover 52 and (b) the rear tractive assembly 56 and/or the front tractive assembly 58. The rear tractive assembly 56 and/or the front tractive assembly 58 may include a drive shaft, a differential, and/or an axle. In some embodiments, the rear tractive assembly 56 and/or the front tractive assembly 58 include two axles or a tandem axle arrangement. In some embodiments, the rear tractive assembly 56 and/or the front tractive assembly 58 are steerable (e.g., using the steering wheel 42). In some embodiments, both the rear tractive assembly 56 and the front tractive assembly 58 are fixed and not steerable (e.g., employ skid steer operations).

In some embodiments, the driveline 50 includes a plurality of prime movers 52. By way of example, the driveline 50 may include a first prime mover 52 that drives the rear tractive assembly 56 and a second prime mover 52 that drives the front tractive assembly 58. By way of another example, the driveline 50 may include a first prime mover 52 that drives a first one of the front tractive elements, a second prime mover 52 that drives a second one of the front tractive elements, a third prime mover 52 that drives a first one of the rear tractive elements, and/or a fourth prime mover 52 that drives a second one of the rear tractive elements. By way of still another example, the driveline 50 may include a first prime mover 52 that drives the front tractive assembly 58, a second prime mover 52 that drives a first one of the rear tractive elements, and a third prime mover 52 that drives a second one of the rear tractive elements. By way of yet another example, the driveline 50 may include a first prime mover 52 that drives the rear tractive assembly 56, a second prime mover 52 that drives a first one of the front tractive elements, and a third prime mover 52 that drives a second one of the front tractive elements.

According to an exemplary embodiment, the suspension system 60 includes one or more suspension components (e.g., shocks, dampers, springs, etc.) positioned between the frame 12 and one or more components (e.g., tractive elements, axles, etc.) of the rear tractive assembly 56 and/or the front tractive assembly 58. In some embodiments, the vehicle 10 does not include the suspension system 60.

According to an exemplary embodiment, the braking system 70 includes one or more braking components (e.g., disc brakes, drum brakes, in-board brakes, axle brakes, etc.) positioned to facilitate selectively braking one or more components of the driveline 50. In some embodiments, the one or more braking components include (i) one or more front braking components positioned to facilitate braking one or more components of the front tractive assembly 58 (e.g., the front axle, the front tractive elements, etc.) and (ii) one or more rear braking components positioned to facilitate braking one or more components of the rear tractive assembly 56 (e.g., the rear axle, the rear tractive elements, etc.). In some embodiments, the one or more braking components include only the one or more front braking components. In some embodiments, the one or more braking components include only the one or more rear braking components. In some embodiments, the one or more front braking components include two front braking components, one positioned to facilitate braking each of the front tractive elements. In some embodiments, the one or more rear braking components include two rear braking components, one positioned to facilitate braking each of the rear tractive elements. In some embodiments, electric regenerative braking is employed (e.g., via the prime mover 52, an electric motor, etc.) in combination with or instead of using the braking system 70 to facilitate braking of one or more components of the driveline 50.

The sensors 90 may include various sensors positioned about the vehicle 10 to acquire vehicle information or vehicle data regarding operation of the vehicle 10 and/or the location thereof. By way of example, the sensors 90 may include an accelerometer, a gyroscope, a compass, a position sensor (e.g., a GPS sensor, etc.), an inertial measurement unit ("IMU"), suspension sensor(s), wheel sensors, an audio sensor or microphone, a camera, an optical sensor, a proximity detection sensor, a Doppler sensor, and/or other sensors to facilitate acquiring vehicle information or vehicle data regarding operation of the vehicle 10 and/or the location thereof. According to an exemplary embodiment, one or more of the sensors 90 are configured to facilitate detecting and obtaining vehicle telemetry data including position of the vehicle 10, whether the vehicle 10 is moving, travel direction of the vehicle 10, slope of the vehicle 10, speed of the vehicle 10, vibrations experienced by the vehicle 10, sounds proximate the vehicle 10, suspension travel of components of the suspension system 60, and/or other vehicle telemetry data.

The vehicle control system 100 may be implemented as a general-purpose processor, an application specific integrated circuit ("ASIC"), one or more field programmable gate arrays ("FPGAs"), a digital-signal-processor ("DSP"), circuits containing one or more processing components, circuitry for supporting a microprocessor, a group of processing components, or other suitable electronic processing components. According to the exemplary embodiment shown in FIG. 2, the vehicle control system 100 includes a processing circuit 102, a memory 104, and a communications interface 106. The processing circuit 102 may include an ASIC, one or more FPGAs, a DSP, circuits containing one or more processing components, circuitry for supporting a microprocessor, a group of processing components, or other suitable electronic processing components. In some embodiments, the processing circuit 102 is configured to execute computer code stored in the memory 104 to facilitate the activities described herein. The memory 104 may be any volatile or non-volatile or non-transitory computer-readable storage medium capable of storing data or computer code relating to the activities described herein. According to an exemplary embodiment, the memory 104 includes computer code modules (e.g., executable code, object code, source code, script code, machine code, etc.) configured for execution by the processing circuit 102. In some embodiments, the vehicle control system 100 may represent a collection of processing devices. In such cases, the processing circuit 102 represents the collective processors of the devices, and the memory 104 represents the collective storage devices of the devices.

In one embodiment, the vehicle control system 100 is configured to selectively engage, selectively disengage, control, or otherwise communicate with components of the vehicle 10 (e.g., via the communications interface 106, a controller area network ("CAN") bus, etc.). According to an exemplary embodiment, the vehicle control system 100 is coupled to (e.g., communicably coupled to) components of the operator controls 40 (e.g., the steering wheel 42, the accelerator 44, the brake 46, the operator interface 48, etc.), components of the driveline 50 (e.g., the prime mover 52), components of the braking system 70, and the sensors 90. By way of example, the vehicle control system 100 may send and receive signals (e.g., control signals, location signals, etc.) with the components of the operator controls 40, the components of the driveline 50, the components of the braking system 70, the sensors 90, and/or remote systems or devices (via the communications interface 106 as described in greater detail herein).

Overall Vehicle—Mower

Figure 3A:
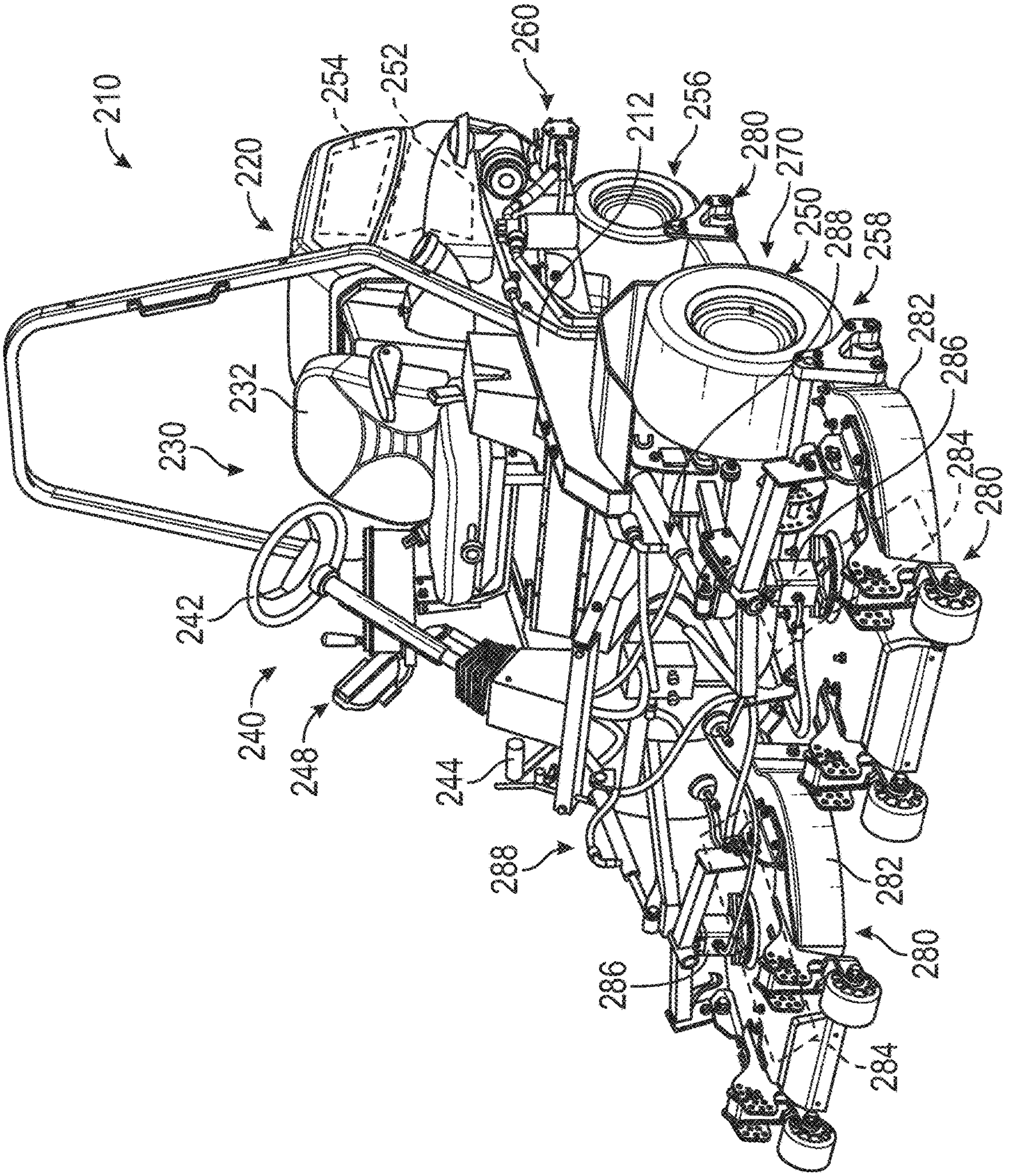
FIG. 3A is a perspective view of a vehicle, according to an exemplary embodiment.
Figure 3B:
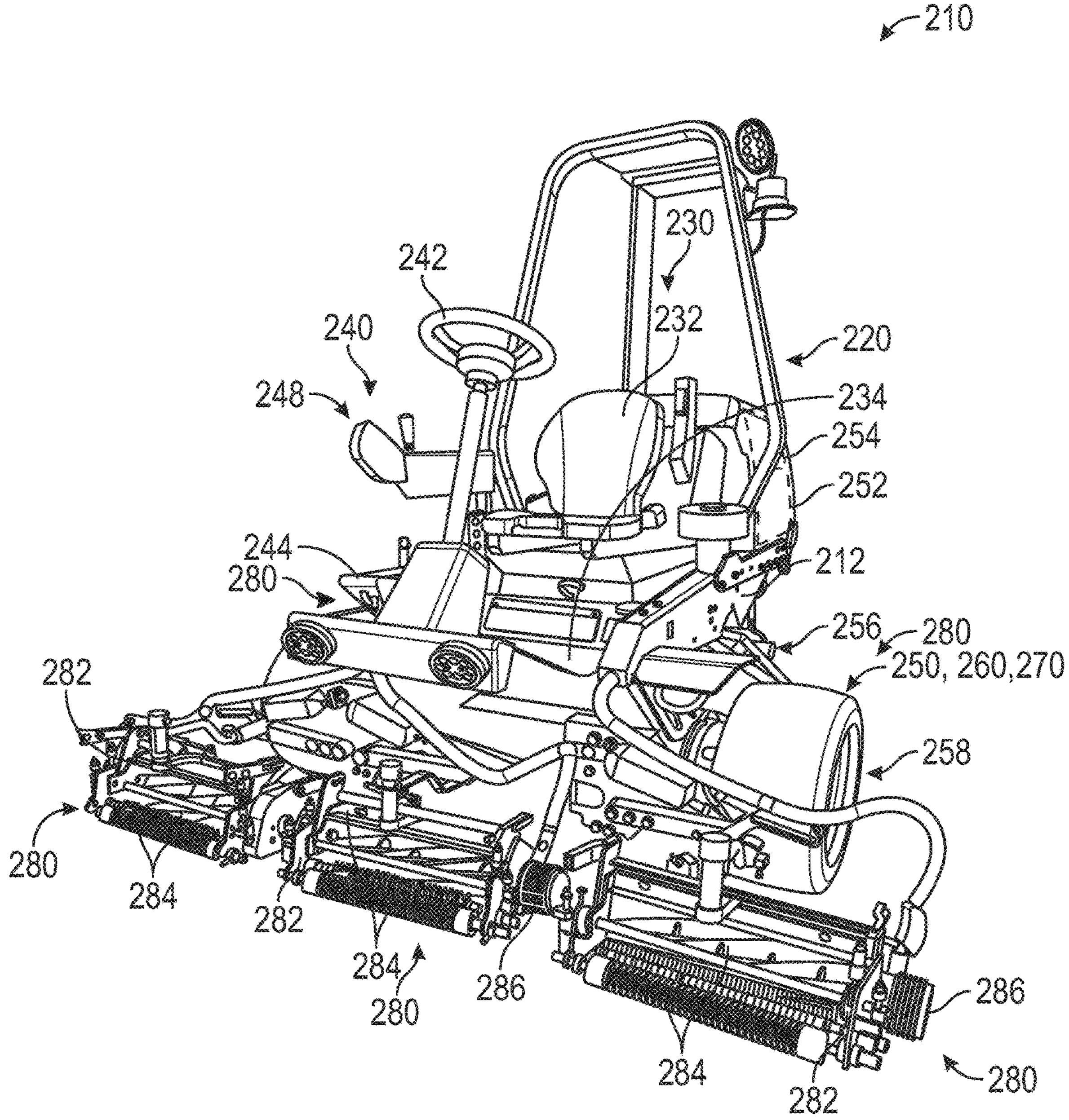
FIG. 3B is a perspective view of a vehicle, according to another exemplary embodiment.
Figure 4:
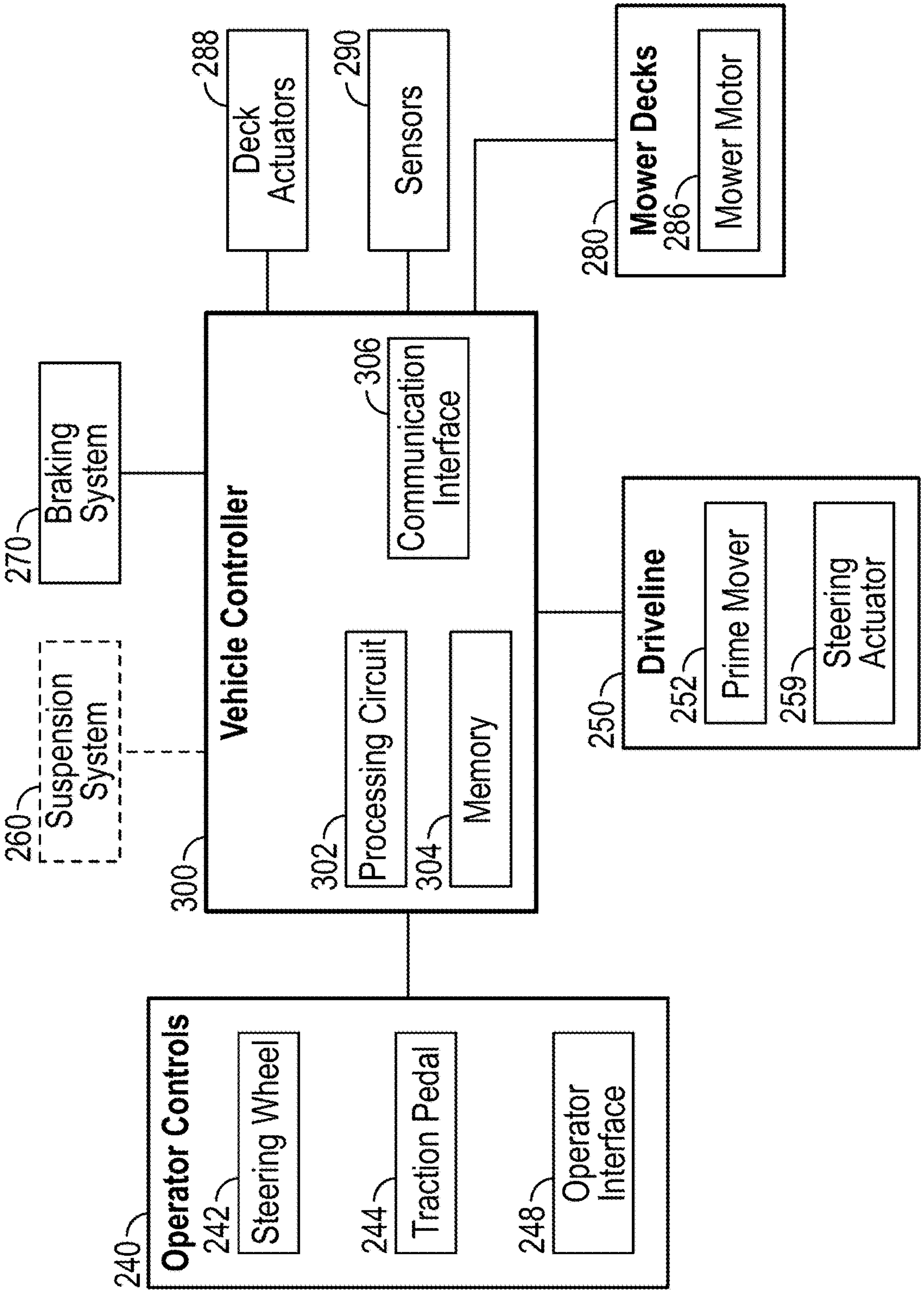
FIG. 4 is a schematic block diagram of the vehicle of FIG. 3A, according to an exemplary embodiment.

As shown in FIGS. 3A-4, a machine or vehicle, shown as vehicle 210, includes a chassis, shown as frame 212; a body assembly, shown as body 220, coupled to the frame 212 and having an occupant portion or section, shown as occupant seating area 230; operator input and output devices, shown as operator controls 240, that are disposed within the occupant seating area 230; a drivetrain, shown as driveline 250, coupled to the frame 212 and at least partially disposed under the body 220; a vehicle suspension system, shown as suspension system 260, coupled to the frame 212 and one or more components of the driveline 250; a vehicle braking system, shown as braking system 270, coupled to one or more components of the driveline 250 to facilitate selectively braking the one or more components of the driveline 250; a series of implements, mower assemblies, or cutting units, shown as mower decks 280; one or more sensors, shown as sensors 290; and a vehicle control system, shown as vehicle controller 300, coupled to the operator controls 240, the driveline 250, the suspension system 260, the braking system 270, the mower decks 280, and the sensors 290. In other embodiments, the vehicle 210 includes more or fewer components.

According to an exemplary embodiment, the vehicle 210 is an off-road machine or vehicle. As shown in FIGS. 3A and 3B, the vehicle 210 is configured as a mower (e.g., a lawnmower, a turf mower, a push mower, a ride-on mower, a stand-on mower, or another type of mower). In other embodiments, the off-road machine or vehicle is a lightweight or recreational machine or vehicle such as a golf cart, golf cars, an all-terrain vehicle ("ATV"), a utility task vehicle ("UTV"), and/or another type of lightweight or recreational machine or vehicle. In some embodiments, the off-road machine or vehicle is a chore product such as aerator, turf sprayer, bunker rake, and/or another type of chore product (e.g., that may be used on a golf course).

According to the exemplary embodiments shown in FIGS. 3A and 3B, the occupant seating area 230 includes a single seat, shown as driver seat 232. In some embodiments, the occupant seating area 230 includes additional seats (e.g., a passenger seat, an additional row of seats, etc.). According to the exemplary embodiments shown in FIGS. 3A and 3B, the driver seat 232 is laterally centered on the body 220 and facing forward. In some embodiments, the driver seat 232 is facing rearward or otherwise positioned. In some embodiments, the occupant seating area 230 is omitted (e.g., the vehicle 210 is configured as a push mower). A portion of the frame 212 defines a platform, deck, or standing area, shown as operator platform 234. The operator platform 234 may extend forward of the driver seat 232 such that the occupant can rest their feet on the operator platform 234 while seated in the driver seat 232. The operator platform 234 may support the occupant as the occupant enters or exits the driver seat 232.

According to an exemplary embodiment, the operator controls 240 are configured to provide an operator with the ability to control one or more functions of and/or provide commands to the vehicle 210 and the components thereof (e.g., turn on, turn off, drive, turn, brake, engage various operating modes, raise/lower a mower deck 280, etc.). As shown in FIGS. 3A-4, the operator controls 240 include a steering interface (e.g., a steering wheel, joystick(s), etc.), shown steering wheel 242, an accelerator interface and/or braking interface (e.g., a pedal, a throttle, etc.), shown as traction pedal 244, and one or more additional interfaces, shown as operator interface 248. The steering wheel 242 may be used by an operator to indicate a desired steering direction of the vehicle 210. The traction pedal 244 may be used to control the speed and direction of travel of the vehicle 210. By way of example, pressing the traction pedal 244 in a first direction may cause the driveline 250 to move the vehicle 210 forward, and pressing the traction pedal 244 in an opposing section direction may cause the driveline 250 to move the vehicle 210 rearward. Returning the traction pedal 244 to a middle or neutral position may cause the braking system 270 and/or the driveline 250 to slow or stop the vehicle 210 or to hold the vehicle 210 in place. Alternatively, the operator interface 248 may include a pair of handles that act as a steering interface and control the driveline 250 in a zero-turn configuration (e.g., a left joystick to control the left side of the driveline 250 and a right joystick to control a right side of the driveline 250). The operator interface 248 may be used to control operation of the mower decks 280 (e.g., changing a cutting speed of a mower deck 280, changing a cutting height of a mower deck 280, etc.). The operator interface 248 may include one or more displays and one or more input devices. The one or more displays may be or include a touchscreen, an LCD display, a LED display, a speedometer, gauges, warning lights, etc. The one or more input device may be or include buttons, switches, knobs, levers, dials, etc.

According to an exemplary embodiment, the driveline 250 is configured to propel the vehicle 210. As shown in FIGS. 3A-4, the driveline 250 includes a primary driver, shown as prime mover 252, an energy storage device, shown as energy storage 254, a first tractive assembly (e.g., axles, wheels, tracks, differentials, etc.), shown as rear tractive assembly 256, and a second tractive assembly (e.g., axles, wheels, tracks, differentials, etc.), shown as front tractive assembly 258. In some embodiments, the driveline 250 is a conventional driveline whereby the prime mover 252 is an internal combustion engine and the energy storage 254 is a fuel tank. The internal combustion engine may be a spark-ignition internal combustion engine or a compression-ignition internal combustion engine that may use any suitable fuel type (e.g., diesel, ethanol, gasoline, natural gas, propane, etc.). In some embodiments, the driveline 250 is an electric driveline whereby the prime mover 252 is one or more electric motors and the energy storage 254 is a battery system. In some embodiments, the driveline 250 is a fuel cell electric driveline whereby the prime mover 252 is one or more electric motors and the energy storage 254 is a fuel cell (e.g., that stores hydrogen, that produces electricity from the hydrogen, etc.). In some embodiments, the driveline 250 is a hybrid driveline whereby (i) the prime mover 252 includes an internal combustion engine and an electric motor/generator and (ii) the energy storage 254 includes a fuel tank and/or a battery system. According to the exemplary embodiments shown in FIGS. 3A and 3B, the rear tractive assembly 256 includes rear tractive elements and the front tractive assembly 258 includes front tractive elements that are configured as wheels. In some embodiments, the rear tractive elements and/or the front tractive elements are configured as tracks. In some embodiments, the driveline 250 is omitted, and the vehicle 210 is propelled by an operator (e.g., the vehicle 210 is configured as a push mower).

According to an exemplary embodiment, the prime mover 252 is configured to provide power to drive the rear tractive assembly 256 and/or the front tractive assembly 258 (e.g., to provide front-wheel drive, rear-wheel drive, four-wheel drive, and/or all-wheel drive operations). In some embodiments, the driveline 250 includes a transmission device (e.g., a gearbox, a continuous variable transmission ("CVT"), etc.) positioned between (a) the prime mover 252 and (b) the rear tractive assembly 256 and/or the front tractive assembly 258. The rear tractive assembly 256 and/or the front tractive assembly 258 may include a drive shaft, a differential, and/or an axle. In some embodiments, the rear tractive assembly 256 and/or the front tractive assembly 258 include two axles or a tandem axle arrangement. In some embodiments, the rear tractive assembly 256 and/or the front tractive assembly 258 are steerable (e.g., based on an input from the steering wheel 242 and using a steering actuator 259 that controls the orientation of one or more wheels). In some embodiments, both the rear tractive assembly 256 and the front tractive assembly 258 are fixed and not steerable (e.g., employ skid steer operations). By way of example, the driveline 250 may include a hydrostatic transmission that permits independent driving of the left and right sides of the driveline 250.

In some embodiments, the driveline 250 includes a plurality of prime movers 252. By way of example, the driveline 250 may include a first prime mover 252 that drives the rear tractive assembly 256 and a second prime mover 252 that drives the front tractive assembly 258. By way of another example, the driveline 250 may include a first prime mover 252 that drives a first one of the front tractive elements, a second prime mover 252 that drives a second one of the front tractive elements, a third prime mover 252 that drives a first one of the rear tractive elements, and/or a fourth prime mover 252 that drives a second one of the rear tractive elements. By way of still another example, the driveline 250 may include a first prime mover 252 that drives the front tractive assembly 258, a second prime mover 252 that drives a first one of the rear tractive elements, and a third prime mover 252 that drives a second one of the rear tractive elements. By way of yet another example, the driveline 250 may include a first prime mover 252 that drives the rear tractive assembly 256, a second prime mover 252 that drives a first one of the front tractive elements, and a third prime mover 252 that drives a second one of the front tractive elements.

According to an exemplary embodiment, the suspension system 260 includes one or more suspension components (e.g., shocks, dampers, springs, etc.) positioned between the frame 212 and one or more components (e.g., tractive elements, axles, etc.) of the rear tractive assembly 256 and/or the front tractive assembly 258. In some embodiments, the vehicle 210 does not include the suspension system 260.

According to an exemplary embodiment, the braking system 270 includes one or more braking components (e.g., disc brakes, drum brakes, in-board brakes, axle brakes, etc.) positioned to facilitate selectively braking one or more components of the driveline 250. In some embodiments, the one or more braking components include (i) one or more front braking components positioned to facilitate braking one or more components of the front tractive assembly 258 (e.g., the front axle, the front tractive elements, etc.) and (ii) one or more rear braking components positioned to facilitate braking one or more components of the rear tractive assembly 256 (e.g., the rear axle, the rear tractive elements, etc.). In some embodiments, the one or more braking components include only the one or more front braking components. In some embodiments, the one or more braking components include only the one or more rear braking components. In some embodiments, the one or more front braking components include two front braking components, one positioned to facilitate braking each of the front tractive elements. In some embodiments, the one or more rear braking components include two rear braking components, one positioned to facilitate braking each of the rear tractive elements. In some embodiments, the driveline 250 is a hydrostatic transmission that performs braking by using hydraulic motors to oppose movement of the tractive elements.

As shown in FIGS. 3A and 3B, the vehicle 210 includes a series of mower decks 280 (e.g., cutting units). Each mower deck 280 includes a deck, housing, or enclosure, shown as housing 282, and a cutting element 284 (e.g., a blade, a flail, a reel, etc.) movably coupled to the housing 282. Specifically, the vehicle of FIG. 3A illustrates a vehicle 210 in which the mower decks 280 each include a cutting element 284 configured as a blade that rotates about a substantially vertical axis. FIG. 3B illustrates an alternative configuration in which the cutting elements 284 are configured as reels that each rotate about a substantially horizontal axis. Except as otherwise specified, the mower 210 of FIG. 3A may be substantially similar to the mower 210 of FIG. 3B. Accordingly, an description of the mower 210 of FIG. 3A may apply to the mower 210 of FIG. 3B, except as otherwise specified.

As shown in FIGS. 3A and 3B, the housing 282 may open downward to expose the cutting element 284 to vegetation below the housing 282. A motor or actuator (e.g., an electric motor, a hydraulic motor, etc.), shown as mower motor 286, is coupled to the housing 282 and drives movement (e.g., rotation, oscillation, etc.) of the cutting element 284. While driven by the mower motor 286, the cutting element 284 crushes, mulches, removes, or otherwise trims vegetation beneath the housing 282. Alternatively, the cutting element 284 may be driven by the prime mover 252 (e.g., through a power take off).

The vehicle 210 includes a series of linear actuators or height adjustment actuators, shown as deck actuators 288, each coupled to the frame 212 and to one or more of the mower decks 280. The deck actuators 288 permit control over a height of the corresponding mower deck 280 relative to the frame 212. The deck actuators 288 may set a cutting height of the mower deck 280. The cutting height represents a final height of vegetation that is trimmed by the mower deck 280. The deck actuators 288 may move the mower deck 280 to a travel position above the cutting height, in which the mower deck 280 is moved out of engagement with the vegetation and the ground surface. The travel position may be used when the vehicle 210 is traveling between job sites and/or the user does not wish to be trimming vegetation.

The sensors 290 may include various sensors positioned about the vehicle 210 to acquire vehicle information or vehicle data regarding operation of the vehicle 210, or the location thereof. The sensors 290 may include various sensors positioned about the vehicle 210 to acquire environment data regarding the environment surrounding the vehicle 210. By way of example, the sensors 290 may include an accelerometer, a gyroscope, a compass, a position sensor (e.g., a GPS sensor, an RTK sensor, etc.), an inertial measurement unit ("IMU"), suspension sensor(s), wheel sensors, an audio sensor or microphone, a camera, an optical sensor, a proximity detection sensor, linear potentiometers, and/or other sensors to facilitate acquiring vehicle information, vehicle data, or environment data regarding operation of the vehicle 210, the location thereof, and/or the surrounding environment. According to an exemplary embodiment, one or more of the sensors 290 are configured to facilitate detecting and obtaining vehicle telemetry data including position of the vehicle 210, whether the vehicle 210 is moving, travel direction of the vehicle 210, slope of the vehicle 210, speed of the vehicle 210, vibrations experienced by the vehicle 210, sounds proximate the vehicle 210, suspension travel of components of the suspension system 260, and/or other vehicle telemetry data.

As shown in FIG. 4, the vehicle controller 300 may be implemented as a general-purpose processor, an application specific integrated circuit ("ASIC"), one or more field programmable gate arrays ("FPGAs"), a digital-signal-processor ("DSP"), circuits containing one or more processing components, circuitry for supporting a microprocessor, a group of processing components, or other suitable electronic processing components. According to the exemplary embodiment shown in FIG. 4, the vehicle controller 300 includes a processing circuit 302, a memory 304, and a communication interface 306. The processing circuit 302 may include an ASIC, one or more FPGAs, a DSP, circuits containing one or more processing components, circuitry for supporting a microprocessor, a group of processing components, or other suitable electronic processing components. In some embodiments, the processing circuit 302 is configured to execute computer code stored in the memory 304 to facilitate the activities described herein. The memory 304 may be any volatile or non-volatile or non-transitory computer-readable storage medium capable of storing data or computer code relating to the activities described herein. According to an exemplary embodiment, the memory 304 includes computer code modules (e.g., executable code, object code, source code, script code, machine code, etc.) configured for execution by the processing circuit 302. In some embodiments, the vehicle controller 300 may represent a collection of processing devices. In such cases, the processing circuit 302 represents the collective processors of the devices, and the memory 304 represents the collective storage devices of the devices.

In one embodiment, the vehicle controller 300 is configured to selectively engage, selectively disengage, control, or otherwise communicate with components of the vehicle 210 (e.g., via the communication interface 306, a controller area network ("CAN") bus, etc.). According to an exemplary embodiment, the vehicle controller 300 is coupled to (e.g., communicably coupled to) components of the operator controls 240 (e.g., the steering wheel 242, the traction pedal 244, the brake 246, the operator interface 248, etc.), components of the driveline 250 (e.g., the prime mover 252), components of the braking system 270, the mower decks 280, the deck actuators 288, and the sensors 290. By way of example, the vehicle controller 300 may send and receive signals (e.g., control signals, location signals, etc.) with the components of the operator controls 240, the components of the driveline 250, the components of the braking system 270, the sensors 290, and/or remote systems or devices (via the communication interface 306 as described in greater detail herein).

The communication interface 306 facilitate communications (e.g., wired or wireless communications) between the vehicle 210 and other devices (e.g., other vehicles 210, the user sensors 420, the user portal 430, the remote systems 440, etc.). By way of example, the communications interface 330 may be configured to employ one or more types of wireless communications protocols including Bluetooth, Wi-Fi, radio, cellular, and/or other suitable wireless communications protocols.

Site Monitoring and Control System

Figure 5:
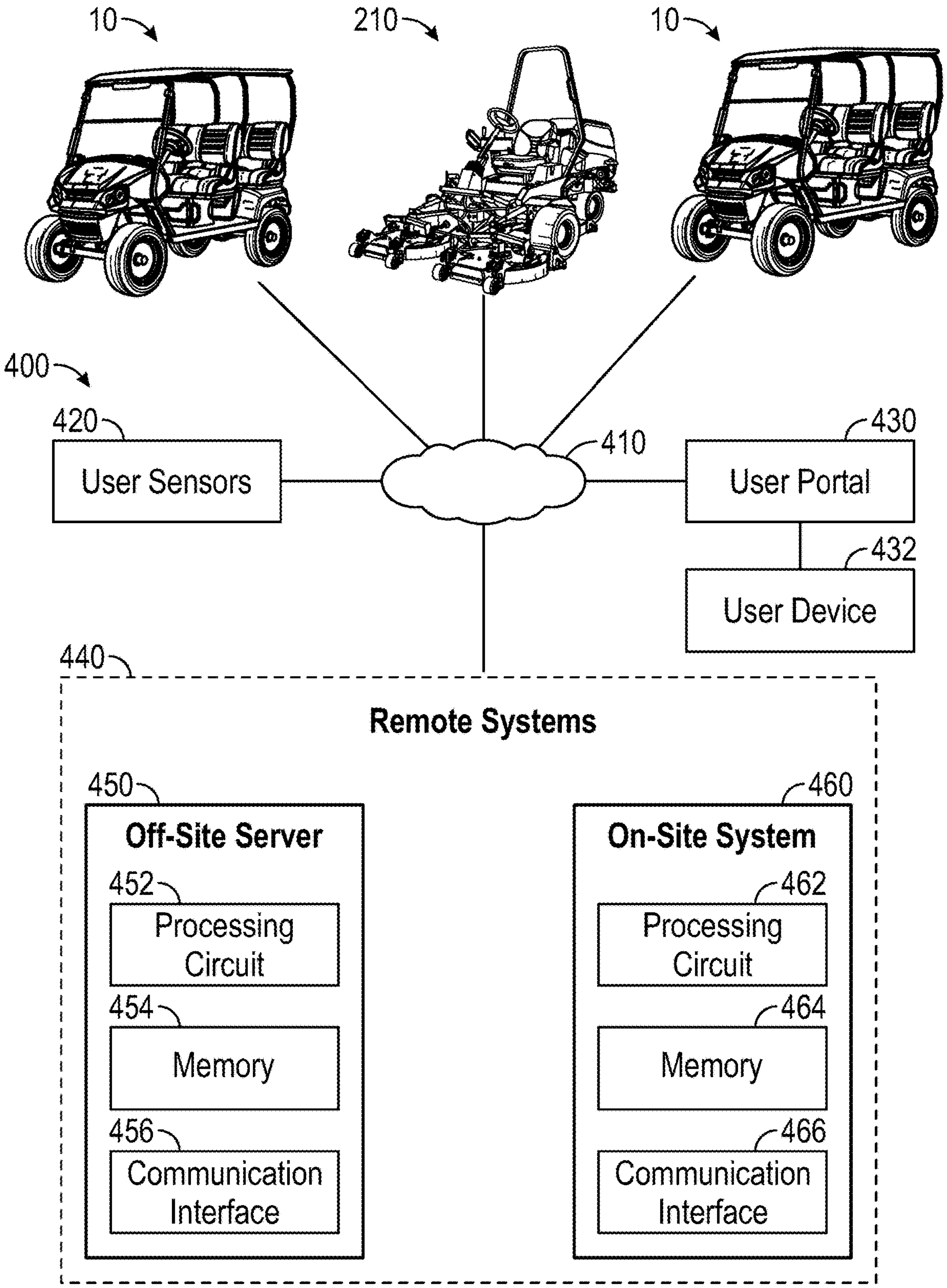
FIG. 5 is a schematic block diagram of a site monitoring and control system including a plurality of the vehicles of FIGS. 1 and 3, according to an exemplary embodiment.

As shown in FIG. 5, a monitoring and control system, shown as site monitoring and control system 400, includes one or more vehicles 10 and/or vehicles 210; one or more second sensors, shown as user sensors 420, positioned remote or separate from the vehicles 10 and/or the vehicles 210; an operator interface, shown as user portal 430, positioned remote or separate from the vehicles 10 and/or the vehicles 210; an external or remote user device, shown as user device 432, positioned remote or separate from the vehicles 10 and/or the vehicles 210; and one or more external processing systems, shown as remote systems 440, positioned remote or separate from the vehicles 10 and/or the vehicles 210. The vehicles 10 and/or the vehicles 210, the user sensors 420, the user portal 430, and the remote systems 440 communicate via one or more communications protocols (e.g., Bluetooth, Wi-Fi, cellular, radio, through the Internet, etc.) through a network, shown as communications network 410. In some embodiments, the site monitoring and control system 400 does not includes the user portal 430 and/or the user device 432.

The user sensors 420 may be or include one or more sensors that are carried by or worn by an operator of one of the vehicles 10 and/or the vehicles 210. By way of example, the user sensors 420 may be or include a wearable sensor (e.g., a smartwatch, a fitness tracker, a pedometer, a heart rate monitor, etc.) and/or a sensor that is otherwise carried by the operator (e.g., a smartphone, etc.) that facilitates acquiring and monitoring operator data (e.g., physiological conditions such a temperature, heartrate, breathing patterns, etc.; location; movement; etc.) regarding the operator. The user sensors 420 may communicate directly with the vehicles 10 and/or the vehicles 210, directly with the remote systems 440, and/or indirectly with the remote systems 440 (e.g., through the vehicles 10 and/or the vehicles 210) as an intermediary).

The user portal 430 may be configured to facilitate operator access to dashboards including the vehicle data, the operator data, information available at the remote systems 440, etc. to manage and operate the site (e.g., golf course) such as for advanced scheduling purposes, to identify persons breaking course guidelines or rules, to monitor locations of the vehicles 10 and/or vehicles 210, etc. The user portal 430 may also be configured to facilitate operator implementation of configurations and/or parameters for the vehicles 10, the vehicles 210 and/or the site (e.g., setting speed limits, setting geofences, etc.). As shown in FIG. 5, the user portal 430 is accessible via the user device 432. The user device 432 may be or include a computer, laptop, smartphone, tablet, or the like. The user portal 430 and the user device 432 may communicate via one or more communications protocols (e.g., Bluetooth, Wi-Fi, cellular, radio, through the Internet, wired connection, etc.) through a network (e.g., a CAN bus, the communications network 410, etc.). The user device 432 includes a display (e.g., a screen, etc.) configured to display one or more graphical user interfaces ("GUIs") of the user portal 430.

As shown in FIG. 5, the remote systems 440 include a first remote system, shown as off-site server 450, and a second remote system, shown as on-site system 460 (e.g., in a clubhouse of a golf course, on the golf course, etc.). In some embodiments, the remote systems 440 include only one of the off-site server 450 or the on-site system 460. As shown in FIG. 5, (a) the off-site server 450 includes a processing circuit 452, a memory 454, and a communications interface 456 and (b) the on-site system 460 includes a processing circuit 462, a memory 464, and a communications interface 466.

According to an exemplary embodiment, the remote systems 440 (e.g., the off-site server 450 and/or the on-site system 460) are configured to communicate with the vehicles 10, the vehicles 210, and/or the user sensors 420 via the communications network 410. By way of example, the remote systems 440 may receive the vehicle data from the vehicles 10 and/or the vehicles 210 and/or the operator data from the user sensors 420. The remote systems 440 may be configured to perform back-end processing of the vehicle data and/or the operator data. The remote systems 440 may be configured to monitor various global positioning system ("GPS") information and/or real-time kinematics ("RTK") information (e.g., position/location, speed, direction of travel, geofence related information, etc.) regarding the vehicles 10, the vehicles 210, and/or the user sensors 420. The remote systems 440 may be configured to transmit information, data, commands, and/or instructions to the vehicles 10 and/or vehicles 210. By way of example, the remote systems 440 may be configured to transmit GPS data and/or RTK data based on the GPS information and/or RTK information to the vehicles 10 and/or vehicles 210 (e.g., which the vehicle control systems 100 and/or the vehicle controllers 300 may use to make control decisions). By way of another example, the remote systems 440 may send commands or instructions to the vehicles 10 and/or vehicles 210 to implement.

According to an exemplary embodiment, the remote systems 440 (e.g., the off-site server 450 and/or the on-site system 460) are configured to communicate with the user portal 430 via the communications network 410. By way of example, the user portal 430 may facilitate (a) accessing the remote systems 440 to access data regarding the vehicles 10, the vehicles 210, and/or the operators thereof and/or (b) configuring or setting operating parameters for the vehicles 10 and/or vehicles 210 (e.g., geofences, speed limits, times of use, permitted operators, etc.). Such operating parameters may be propagated to the vehicles 10 and/or vehicles 210 by the remote systems 440 (e.g., as updates to settings) and/or used for real time control of the vehicles 10 and/or vehicles 210 by the remote systems 440.

Autonomous Robotic Equipment Operation

Figure 6:
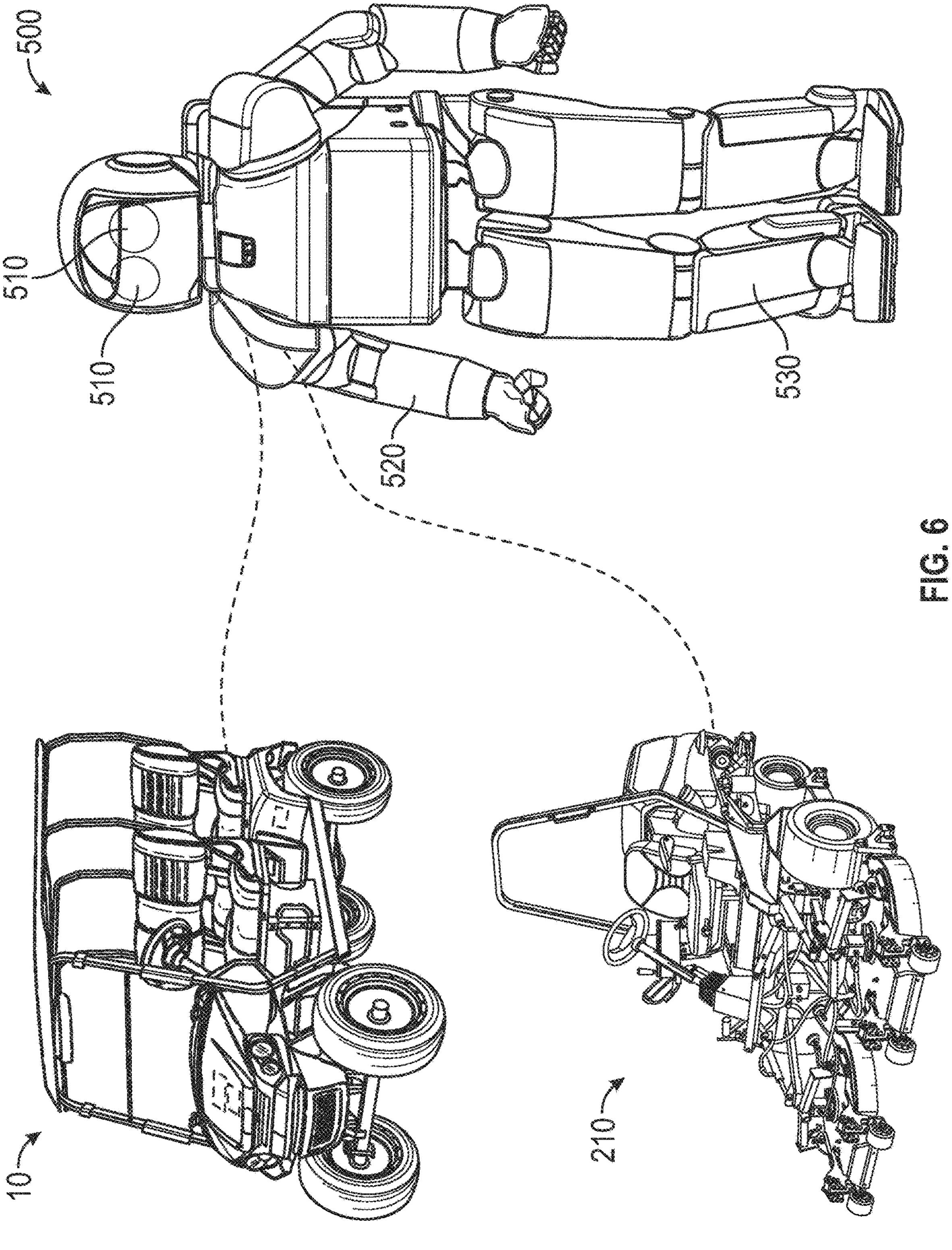
FIG. 6 is a perspective view of a robotic system communicating with the vehicles of FIGS. 1 and 3, according to an exemplary embodiment.
Figure 7:
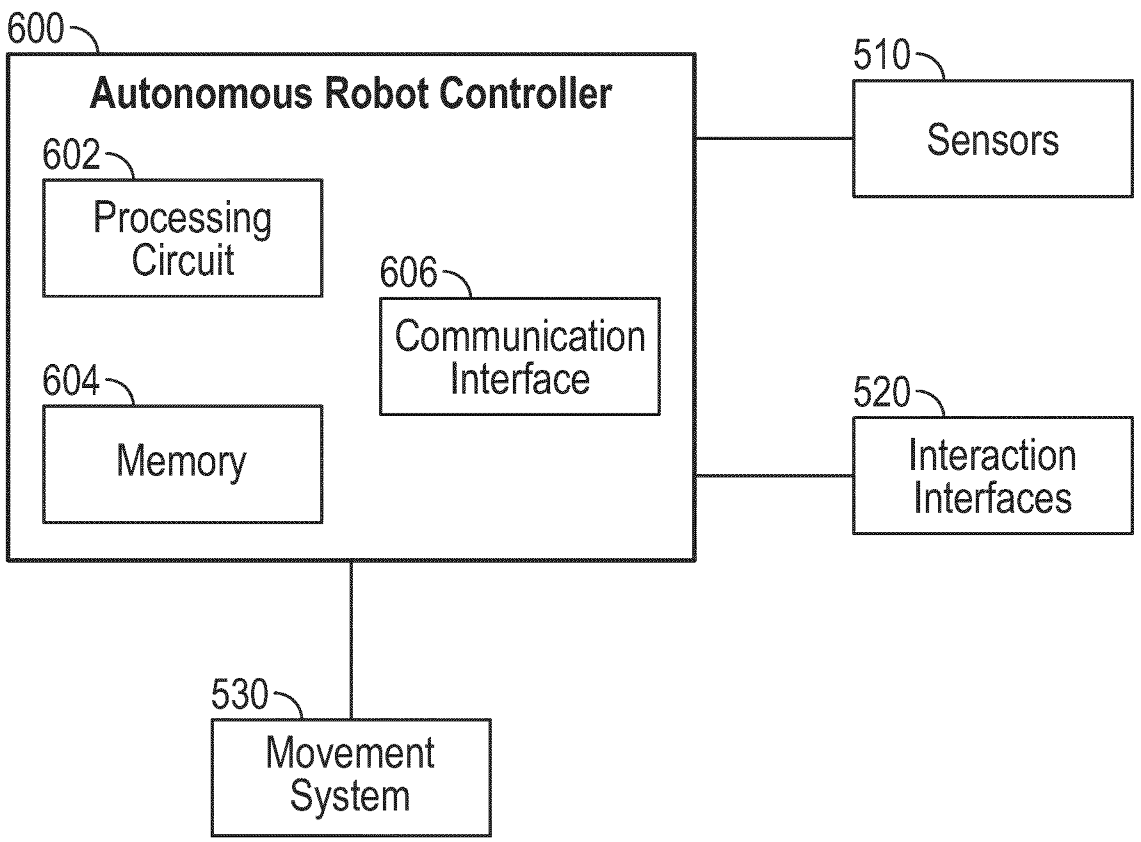
FIG. 7 is a schematic block diagram of the robotic system of FIG. 6, according to an exemplary embodiment.

As shown in FIGS. 6 and 7, a robotic system, shown as robotic system 500, includes one or more sensors, shown as sensors 510; an interaction interface, shown as interaction interface 520; and a movement system, shown as movement system 530, and a control system, shown as autonomous robot controller 600, coupled to the sensors 510, the interaction interface 520, and the movement system 530. In some embodiments, the robotic system 500 includes more or fewer components.

According to an exemplary embodiment, the robotic system 500 is an autonomously functioning robot configured to perform various tasks using human-operable equipment, such as vehicles (e.g., vehicle 10 and/or vehicle 210). As shown in FIG. 6, the robotic system 500 is configured as an autonomous humanoid robot. In other embodiments, the robotic system 500 may be a specially designed autonomous robot specifically configured to be installed within or on and to operate certain types of human-operable equipment.

According to the exemplary embodiment shown in FIG. 6, the sensors 510 include optical sensors (e.g., cameras, infrared sensors, lidar sensors, etc.). In some embodiments, the sensors 510 additionally or alternatively include audio sensors or microphones, temperature sensors, accelerometers, gyroscopes, tilt sensors, position sensors (e.g., a GPS sensor), an IMU, proximity detection sensors, Doppler sensors, and/or other sensors to facilitate acquiring information pertaining to the robotic system 500 and/or its surroundings to allow the robotic system 500 to autonomously move and perform tasks.

According to an exemplary embodiment, the interaction interfaces 520 are configured physically interact with various external objects. For example, in some instances, the interaction interfaces 520 are configured to physically interact with and operate operator controls (e.g., operator controls 40, operator controls 240) of various pieces of equipment (e.g., the vehicle 10, the vehicle 210). In the illustrated example shown in FIG. 6, the interaction interfaces 520 include a pair of robotic arms and corresponding robotic grabbers (e.g., robotic hands). In other embodiments, the interaction interfaces 520 may include various additional or alternative types of interaction interfaces. For example, in some instances, the interaction interfaces 520 may include fewer or additional robotic arms and/or robotic grabbers, robotic wheel mechanisms, robotic tools (e.g., drills, saws, fans, etc.), and/or any other type of interaction interface configured to physically interact with external objects.

According to an exemplary embodiment, the movement system 530 is configured to move the robotic system between physical locations. For example, in some instances, the movement system 530 is configured to allow the robotic system 500 to move onto or otherwise mount various equipment, such as the vehicle 10 and/or the vehicle 210, to allow for the robotic system 500 to operate the equipment. In the illustrated example shown in FIG. 6, the movement system 530 is a pair of robotic legs and corresponding robotic feet configured to allow the robotic system 500 to walk or otherwise traverse between physical locations. For example, the robotic system 500 may utilize the pair of robotic legs and corresponding robotic feet to walk, step onto, or otherwise mount the vehicle 10 and/or the vehicle 210. That is, in some instances, the robotic system 500 may utilize the movement system 530 to arrange itself on the front row seating 32 or the front row seating 232 in a similar position to a human operator operating the vehicle 10 and/or the vehicle 210 in preparation for operating the vehicle 10 and/or the vehicle 210.

In some instances, the movement system 530 may further include or selectively utilize portions of the interaction interfaces 520 if necessary to move into a given position. For example, in some instances, the robotic system 500 may utilize the robotic arms and/or robotic hands of the interaction interfaces 520 to provide additional support and/or to move itself into an operating position on the vehicle 10 and/or the vehicle 210. Further, in some instances, the movement system 530 may include one or more additional movement features, such as motorized wheels, propellers (e.g., to move the robotic system 500 through water or another liquid), a rotor system (e.g., to allow the robotic system 500 to fly), etc.

The autonomous robot controller 600 may be implemented as a general-purpose processor, an application specific integrated circuit ("ASIC"), one or more field programmable gate arrays ("FPGAs"), a digital-signal-processor ("DSP"), circuits containing one or more processing components, circuitry for supporting a microprocessor, a group of processing components, or other suitable electronic processing components. According to the exemplary embodiment shown in FIG. 7, the autonomous robot controller 600 includes a processing circuit 602, a memory 604, and a communication interface 606. The processing circuit 602 may include an ASIC, one or more FPGAs, a DSP, circuits containing one or more processing components, circuitry for supporting a microprocessor, a group of processing components, or other suitable electronic processing components. In some embodiments, the processing circuit 602 is configured to execute computer code stored in the memory 104 to facilitate the activities described herein. The memory 604 may be any volatile or non-volatile or non-transitory computer-readable storage medium capable of storing data or computer code relating to the activities described herein. According to an exemplary embodiment, the memory 604 includes computer code modules (e.g., executable code, object code, source code, script code, machine code, etc.) configured for execution by the processing circuit 602. In some embodiments, the autonomous robot controller 600 may represent a collection of processing devices. In such cases, the processing circuit 602 represents the collective processors of the devices, and the memory 604 represents the collective storage devices of the devices.

In one embodiment, the autonomous robot controller 600 is configured to selectively engage, selectively disengage, control, or otherwise communicate with components of the robotic system 500 (e.g., via the communication interface 606, a controller area network ("CAN") bus, etc.). According to an exemplary embodiment, the autonomous robot controller 600 is coupled to (e.g., communicably coupled to) components of the sensors 510, the interaction interface 520, and the movement system 530. By way of example, the autonomous robot controller 600 may send and receive signals (e.g., control signals, location signals, etc.) with the components of the sensors 510, the interaction interface 520, the movement system 530, and/or remote systems or devices (via the communication interface 606 as described in greater detail herein).

Figure 8:
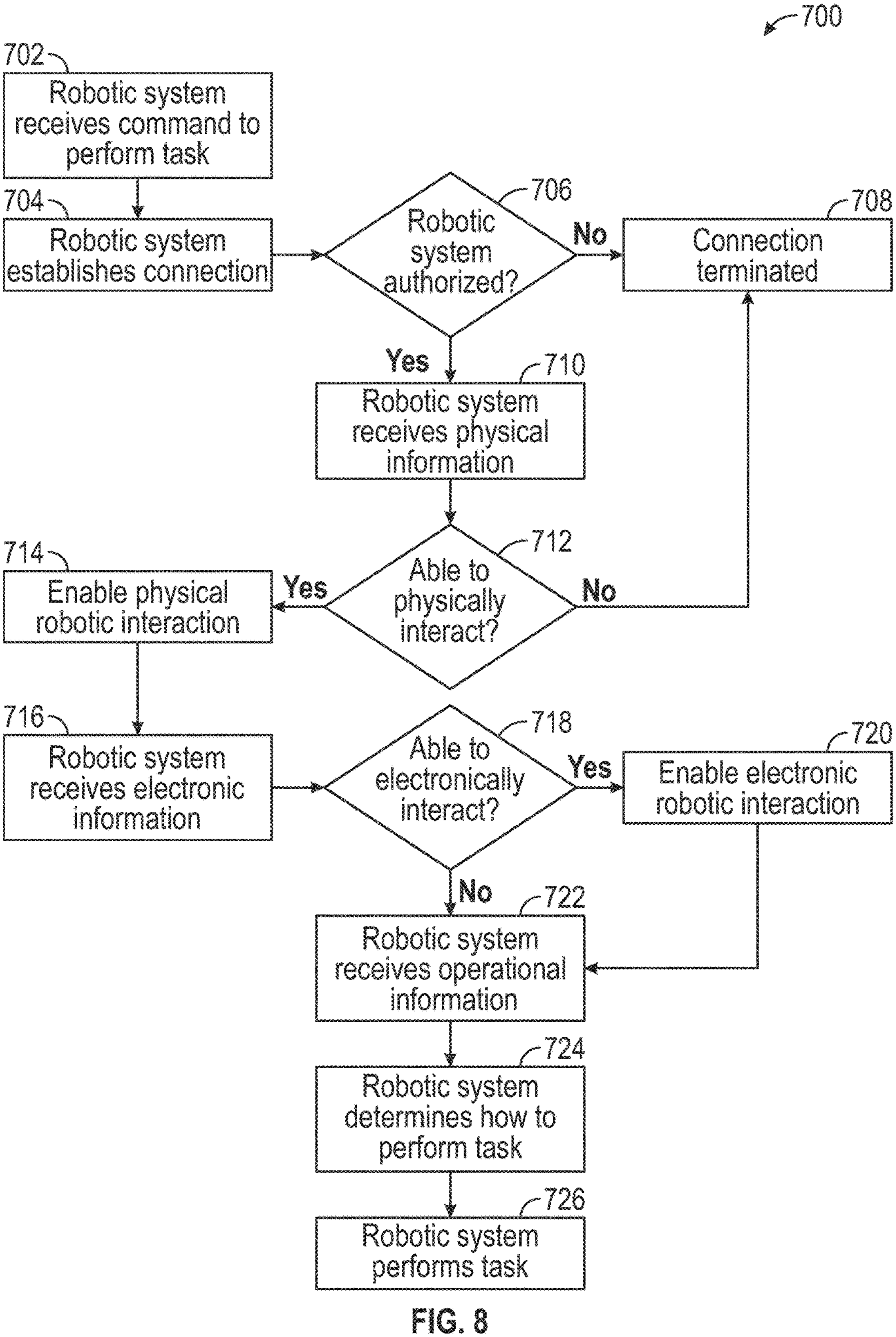
FIG. 8 is a flowchart of a method for autonomously controlling a vehicle or another piece of equipment using a robotic system, according to an exemplary embodiment.

Referring now to FIG. 8, a method 700 for autonomously controlling a vehicle (e.g., the vehicle 10, the vehicle 210, a car, a boat, an aircraft, a helicopter, etc.) or another piece of equipment (e.g., a power tool, a construction tool or machine, a shopfloor machine, a fabrication machine, etc.) using a robotic system (e.g., robotic system 500) is provided below. It should be appreciated that the following description is provided as an example and is in no way meant to be limiting. Furthermore, it should be appreciated that, in some embodiments, various steps may be added, omitted, and/or rearranged within the method 700 without departing from the scope of the present disclosure.

As a general overview, the method 700 allows for a robotic system (e.g., the robotic system 500) to receive a command to perform a task using a vehicle (e.g., the vehicle 10, the vehicle 210) or another piece of equipment that the robotic system has never interacted with before by establishing a connection with the vehicle or equipment or an external system (e.g., one of the remote systems 440) and acquiring various information pertaining to the vehicle or equipment, as well as its operational characteristics.

Traditional autonomous robotic systems may perceive objects and learn about their surroundings based on observations made from various continuously collected data captured using onboard sensors. The traditional systems may then use their own observations to plan interactions with objects. Often, reinforcement learning or other machine learning methods are required for these traditional systems to "learn" how to interact with objects over multiple trials and iterations. Other times, especially involving mechanically simplistic autonomous systems, articulation ranges, movements, and constraints are manually set by a human operator prior to autonomous operation.

However, when traditional systems encounter complex systems such as vehicles or other equipment, it is difficult for traditional systems to quickly gather sufficient information to successfully operate the complex systems. The method 700 solves this problem by allowing for a robotic system (e.g., the robotic system 500) to obtain information about vehicle or equipment operation either directly from the vehicle or equipment using a vehicle- or equipment-to-robot protocol or by communicating with an external system (e.g., one of the remote systems 440) to acquire the information.

For example, the robotic system may acquire instructions for and data on the mechanical actuation of vehicle or equipment parts or controls, the electronic integration of vehicle or equipment sensors, the electronic issuing of commands, safety constraints, mechanical limits, and/or owner specific constraints and instructions. In short, the robotic system is able to quickly acquire all of the necessary instructional and factual information necessary for the robotic system to operate the vehicle or equipment. In some instances, the robotic system is also able to use the vehicle- or equipment-to-robot protocol as a vehicle- or equipment-to-robot interface that allows the robotic system to directly control various aspects of the vehicle or equipment and to utilize various vehicle or equipment sensors and associated data.

The method 700 begins with the robotic system 500 receiving a command to perform a task, at step 702. For example, in some instances, the robotic system 500 may receive the command via a communication from a device (e.g., the user device 432, one of the remote systems 440). In some other instances, the robotic system 500 may receive the command as a spoken commend from a user that is captured by a microphone or other audio sensing device of the robotic system 500 (e.g., one of the sensors 510.

The task may be any of a variety of tasks performable using a vehicle or other piece of equipment. For example, in some instances, the command may be for the robotic system 500 to drive the vehicle 10 from a first location (e.g., a clubhouse) to a second location (e.g., a tee box). In some other instances, the command may be for the robotic system 500 to utilize the vehicle 210 to mow a particular section of a golf course. It will be appreciated that a variety of different tasks may be requested using a variety of different types of vehicles and/or equipment, and these examples are in no way meant to be limiting.

After receiving the command, at step 702, the robotic system 500 then establishes a connection with the appropriate vehicle (e.g., the vehicle 10, the vehicle 210) or other piece of equipment or, in some instances, an external system (e.g., one of the remote systems 440) to acquire the necessary information to perform the task, at step 704. For example, in some instances, the robotic system 500 may establish a wireless connection with the vehicle or other piece of equipment via a short-range communication. In some instances, the short-range communication may be a vehicle- or equipment-to-robot short-range communication protocol (e.g., a vehicle- or equipment-to-robot handshake) configured to initiate the transfer of information from the vehicle or equipment to the robotic system 500. In some embodiments, the short-range communication may be a transmission control protocol (TCP) communication, an HTTP persistent connection, or any other suitable short-range communication. In some embodiments, the wireless connection may be established via one or more edge computing devices on the vehicle or equipment and/or on the robotic system 500.

In some instances, the robotic system 500 is configured to establish a wired connection with the vehicle or other piece of equipment. For example, in some instances, the robotic system 500 includes one or more accessible communication input ports that may be connected with one or more communication ports of the vehicle or other piece of equipment via a wire to form a wired connection, such as a controller area network (CAN) connection or a serial connection.

In some instances, the robotic system 500 is configured to obtain external system connection information (e.g., a website uniform resource link (URL)) from the vehicle or other piece of equipment that allows for the robotic system 500 to establish a wireless connection with an external system (e.g., one of the remote systems 440). For example, in some instances, the vehicle or other piece of equipment may have a barcode (e.g., a quick-response (QR) code) displayed thereon that the robotic system 500 may scan (e.g., via one of the sensors 510) to obtain the external system connection information. In some other instances, the vehicle or other piece of equipment may have a radio frequency identification (RFID) tag thereon that the robotic system 500 may read (e.g., via one of the sensors 510) to obtain the external system connection information. In some other instances, the vehicle or other piece of equipment may include a near-field communication (NFC) device (e.g., the communications interface 106, the communication interface 306), and the robotic system 500 may be able to obtain the external system connection information via a near-field communication (NFC) (e.g., using the communication interface 606). In any case, upon obtaining the external system connection information, the robotic system 500 may establish a wireless connection with the external system (e.g., one of the remote systems 440) via the communications network 410.

Upon establishing the connection with the vehicle or other piece of equipment or with the external system, at step 704, the robotic system 500 determines whether it is authorized to operate the vehicle (e.g., the vehicle 10, the vehicle 210) or other piece of equipment at step 706. For example, in some instances, the vehicle or equipment may have one or more authorization requirements that must be met prior to being operated. Accordingly, the robotic system 500 may acquire the requisite authorization information via the established connection and determine whether it is authorized to operate the vehicle or equipment based on the acquired authorization information.

In some embodiments, an external system (e.g., one of the remote systems 440) may control authorizations for the robotic system 500 and its ability to control various vehicles or other pieces of equipment. For example, the external system may utilize a digital signature and/or another secure authorization method to selectively authorize or de-authorize the robotic system 500 to operate various vehicles or other pieces of equipment. In some embodiments, the authorization may be tied to one or more system updates provided by the external system to the robotic system 500 (e.g., to ensure proper functionality of the robotic system 500).

If the robotic system 500 is not authorized to operate the vehicle (e.g., the vehicle 10, the vehicle 210) or equipment, the established connection is terminated, at step 708. In some instances, the robotic system 500 is configured to provide a notification to a user (e.g., audibly via a speaker of the robotic system 500 or via a transmitted communication to the user device 432) regarding its lack of authorization and/or prompting the user to perform one or more required authorization-related tasks before the robotic system 500 re-attempts to operate the vehicle or equipment.

If the robotic system 500 is authorized to operate the vehicle or equipment, the robotic system 500 then acquires or otherwise receives physical information associated with the vehicle (e.g., the vehicle 10, the vehicle 210) or equipment via the established connection. In some instances, the robotic system 500 receives the physical information in a specialized unified robot description format.

The physical information may include various spatial information associated with the vehicle (e.g., the vehicle 10, the vehicle 210) or equipment, such as physical dimensions of various components of the vehicle or equipment; spatial reference points (e.g., spatial anchor points) on the vehicle or equipment; locations of specialized tags on the vehicle or equipment for collision meshes; safe mounting and/or operational areas, locations, paths, or poses (e.g., mounting, transition, and/or operating procedure pose keyframes showing physical orientations of the robotic system 500) for mounting and/or operating the vehicle or equipment; areas, locations, paths, or poses to avoid on the vehicle or equipment; and/or locations of physically operable controls on the vehicle or equipment. In some instances, the physical information may include various movement information associated with the vehicle (e.g., the vehicle 10, the vehicle 210) or equipment, such as locations of movable components (e.g., control joints, actuators, motors, wheels, mower blades, etc.) on the vehicle or equipment or a range of motion of the movable components on the vehicle or equipment.

Once the robotic system 500 has acquired or otherwise received the various physical information, at step 710, the robotic system 500 then determines whether it is able to physically interact with the vehicle (e.g., the vehicle 10, the vehicle 210) or equipment, at step 712. For example, the robotic system 500 may compare various physical dimensions and/or a ranges of motion of its components (e.g., the interaction interface 520, the movement system 530) to the various physical information (e.g., the spatial information and the movement information) associated with the vehicle or equipment. The robotic system 500 may then determine whether the robotic system 500 is able to mount the vehicle or equipment (if necessary) and whether the robotic system 500 is able to physically access and interact with the various physically operable controls on the vehicle or equipment.

If the robotic system 500 determines that it is unable to either mount (if necessary) or physically access and interact with the various physically operable controls on the vehicle or equipment, the connection is similarly terminated, at step 708. Again, the robotic system 500 may provide the user with a notification (e.g., verbally via a speaker or via a transmitted message to the user device 432) explaining why the robotic system 500 is unable to physically interact with the vehicle or equipment.

If the robotic system 500 determines that it is able to mount (if necessary) and physically access and interact with the various physically operable controls on the vehicle or equipment, robotic system 500 enables physical robotic interaction with the vehicle (e.g., the vehicle 10, the vehicle 210) or equipment by storing the various physical information associated with the vehicle or equipment and an indication that the robotic system 500 is able to physically operate the vehicle or equipment in the memory 604.

In some instances, if the robotic system 500 determines that it is only able to physically access and interact with a subset of the various physically operable controls on the vehicle or equipment, the robotic system may enable partial physical robotic interaction with the vehicle by similarly storing the various physical information associated with the vehicle or equipment along with an indication that the robotic system 500 is partially able to physically operate the vehicle or equipment and explaining the physically operable controls that can and cannot be accessed and interacted with by the robotic system in the memory 604.

In some instances, the robotic system 500 may similarly provide a notification to the user (e.g., verbally via a speaker or via a transmitted message to the user device 432) confirming that the robotic system 500 is able to physically operate the vehicle or equipment or explaining the partial capability of the robotic system 500 to physically operate the vehicle or equipment.

The robotic system 500 then acquires or otherwise receives electronic information associated with the vehicle (e.g., the vehicle 10, the vehicle 210) or equipment via the established connection. The electronic information may include information on whether there are any components on the vehicle or equipment that may be electronically interacted with by the robotic system 500 (e.g., digital interfaces, available vehicle sensors, and available digital commands, etc.). For example, in some instances, the robotic system 500 may receive various digital command documentation configured to allow for the robotic system 500 to link with or otherwise initialize connections with various sensors (e.g., sensors 90, sensors 290) and/or electronic controls (e.g., vehicle control system 100, vehicle controller 300) of the vehicle (e.g., the vehicle 10, the vehicle 210) or equipment. In some instances, the digital command documentation may be provided to the robotic system 500 from the vehicle 10 or the vehicle 210 via a vehicle-to-everything standard protocol and/or via a robot operating system (ROS) based protocol (e.g., ROS 2 documentation) that is translated to a vehicle controller protocol (e.g., a motor controller protocol) and vice versa. In other instances, the digital command documentation may be provided to the robotic system 500 in various other formats, as desired for a given application. In some instances, the electronic information may further include various additional electronic component integration initialization information, software uploads and/or downloads to allow the robotic system 500 to interact with the electronic components of the vehicle or equipment, and/or various security authentication information configured to allow the robotic system 500 to interact with the electronic components of the vehicle or equipment.

The robotic system 500 then determines whether it is able to electronically interact with any components of the vehicle or equipment based on the electronic information, at step 718. If the robotic system 500 determines that it is able to electronically interact with components of the vehicle or equipment, the robotic system 500 then enables electronic robotic interaction, at step 720. For example, to enable the electronic robotic interaction, the robotic system 500 may link or initialize connections with the various components that are able to be electronically interacted with (e.g., using the digital command documentation). The robotic system 500 may similar store the various electronic information associated with the vehicle or equipment and an indication that the robotic system 500 is able to electronically interact with the various components of the vehicle or equipment in the memory 604.

In some instances, the robotic system 500 may similarly provide a notification to the user (e.g., verbally via a speaker or via a transmitted message to the user device 432) confirming that the robotic system 500 is able to electronically interact with the vehicle or equipment and explaining the nature of the interaction (e.g., which components may be electronically interacted with).

After enabling the electronic robotic interaction, at step 720, or after determining that the robotic system 500 is not able to electronically interact with the vehicle or equipment, at step 718, the robotic system 500 then acquires or otherwise receives various operational information associated with the vehicle (e.g., the vehicle 10, the vehicle 210) or equipment, at step 722. In some instances, the operational information includes physically operable control information pertaining to how the physically operable controls of the vehicle or equipment are operated and how the physically operable controls affect the operation of the vehicle or equipment. For example, the operational information may explain how interaction with various continuous control components (e.g., a wheel, joystick, throttle, etc.) and/or discreet control components (e.g., push buttons, switches) affect operation of the vehicle or equipment (e.g., which controlled components are affected and how the controlled components are affected by the interaction). In some instances, the operational information may be presented to or acquired by the robotic system 500 as various cause-and-effect operational relationships and/or various listed parameters that are modified in response to the interactions. In some instances, the operational information may be provided as various operator training videos or links thereto.

In some instances, the operational information may further include one or more operational constraints and/or operational strategies associated with operation of the vehicle (e.g., the vehicle 10, the vehicle 210) or equipment. For example, the operational information may receive text prompts from the original equipment manufacturer and/or an owner of the vehicle or equipment including various safety and/or other operational constraints. In some instances, the original manufacturer and/or the owner of the vehicle or equipment may set various operational constraints for operation of the vehicle or equipment, such as a speed limit, a geographical operational boundary, etc.

In some instances, the original manufacturer and/or the owner of the vehicle or equipment may similarly set one or more operational strategies or guidelines for the vehicle or equipment. For example, the operational strategies or guidelines may include reducing a driving speed of a vehicle (e.g., the vehicle 10, the vehicle 210) near putting greens, turning off rotation of mower blades (e.g., the cutting element 284) when driving a mower (e.g., the vehicle 210) on non-grass areas, lifting mower blades (e.g., the cutting element 284) when not mowing, mowing in a certain pattern and/or with a certain height based on location of a mower (e.g., the vehicle 210), etc. In some instances, the owner may be able to update or modify the operational constraints and/or strategies (within certain required safety limits) using a user device or other user interface (e.g., the user device 432, the operator interface 48, and/or the operator interface 248).

It should be appreciated that the operational information pertaining to the physically operable controls of the vehicle or equipment, as well as the operational constraints and strategies, will vary from vehicle to vehicle (e.g., mower, skid steer, golf cart, helicopter, boats, aircraft, etc.) and between different pieces of equipment (e.g., construction and power tools, shopfloor and fabrication machines), and the aforementioned operational information, constraints, and strategies are provided as illustrative examples and are in no way meant to be limiting.

The robotic system 500 then determines how to perform the task of the received command using the vehicle (e.g., the vehicle 10, the vehicle 210) or equipment, at step 724. For example, the robotic system 500 is configured to utilize the various acquired physical information, electronic information, and operational information to determine how to mount (if necessary) and operate the vehicle or equipment to perform the task. That is, the robotic system 500 is configured to utilize the physical information to identify the spatial and movement information associated with the vehicle or equipment and identify how to properly mount (if necessary) the vehicle or equipment for operation. The robotic system 500 is then configured to utilize the electronic information and operational information to determine how different physical and electronic interactions with the physically operable controls and/or linked electronic components affect operation of the vehicle or equipment, such that the robotic system 500 is generally able to operate the vehicle or equipment.

Once the robotic system 500 has determined or "learned" how to generally operate the vehicle or equipment using the various physical information, electronic information, and operational information acquired view the established connection, the robotic system 500 may then utilize this "skill" in combination with perceived information (e.g., collected via the sensors 510) to learn or otherwise determine (e.g., via the autonomous robot controller 600 employing various reinforcement learning and/or other machine learning methods) how to perform the task commanded by the user using the vehicle or equipment.

The robotic system 500 then performs the task using the vehicle (e.g., the vehicle 10, the vehicle 210) or equipment, at step 726. For example, if necessary for operation, the robotic system 500 mounts the vehicle or equipment (e.g., using the movement system 530) by utilizing the spatial information and the movement information associated with the vehicle or equipment to move into an operating position on the vehicle or equipment while avoiding any dangerous areas (e.g., the cutting element 284 of the vehicle 210) on the vehicle or equipment. The robotic system 500 then engages the physical operator controls and/or the various linked electronic components to operate the vehicle or equipment to perform the task, taking into account any operational constraints and/or operational strategies.

In some embodiments, during operation, the robotic system 500 implements or otherwise builds in Asimov's "Three Laws of Robotics" to its own functionality. First, in some instances, the robotic system 500 may ensure that its actions do not harm humans (e.g., by ensuring that there are sufficient sensors available to detect humans and avoid performing operations that may cause harm). Second, in some instances, the robotic system 500 may ensure that orders provided by humans are obeyed (e.g., by not allowing operation unless sufficient sensors are available to receive and verify human commands), unless those commands would result in harm to humans. Third, in some instances, the robotic system 500 may ensure that it does not cause itself and/or the operated vehicle or piece of equipment harm (e.g., that it does not operate in a manner that would destroy the robotic system, vehicle, and/or other piece of equipment), unless it would cause harm to humans or, in some instances, interfere with obeying a human command.

In some instances, by taking into account various operational strategies provided by the manufacturer and/or owner of the vehicle or equipment, the robotic system 500 is able to operate the vehicle or equipment as if the robotic system 500 was an experienced operator.

In some instances, during operation of the vehicle or equipment, the robotic system 500 may receive various sensor data from the vehicle or equipment via one or more linked sensors (e.g., sensors 90, sensors 290) and utilize the sensor data to more accurately or efficiently operate the vehicle or equipment. For example, the linked sensors may provide indications of various component statuses (e.g., battery level, fuel level, etc.), fault code information, internal temperature readings, etc., which the robotic system 500 may utilize to make more intelligent and/or informed operating decisions.

Accordingly, the method 700 allows for a robotic system (e.g., the robotic system 500) to receive a command to perform tasks using vehicles or equipment that the robotic system 500 has never interacted with by establishing a connection that allows for various physical, electronic, and operational information about the vehicles or equipment to be acquired by the robotic system 500 and utilized by the robotic system 500 to quickly determine or learn how to operate the vehicle or equipment. In some instances, the robotic system 500 may receive multiple commands to perform tasks with different vehicles, and the robotic system 500 may utilize the method 700 to quickly determine or learn how to operate each different vehicle or piece of equipment, even when the different vehicles or pieces of equipment have different operational characteristics (e.g., different types of vehicles having different types of physical and/or electronic operator controls that function differently).

It should be appreciated that the method 700 may be applied to a broad array of vehicles and equipment designed to be operated by humans. For example, the method 700 may be applied to any of the vehicle types discussed herein, automobiles, boats, aircraft, helicopters, trains, power tools, construction tools or machines, shopfloor machines, fabrication machines, and any other vehicle or equipment originally designed for human operation or modified to allow robotic operation.

Further, while the robotic system 500 is illustrated as a humanoid robot in FIG. 6, it should be appreciated that, in some instances, the robotic system 500 may be provided as an autonomous kit that may be installed within or on a vehicle or a piece of equipment to similarly utilize the method 700 to determine how to and ultimately perform various commanded tasks using the vehicle or piece of equipment.

As utilized herein with respect to numerical ranges, the terms "approximately," "about," "substantially," and similar terms generally mean +/−10% of the disclosed values, unless specified otherwise. As utilized herein with respect to structural features (e.g., to describe shape, size, orientation, direction, relative position, etc.), the terms "approximately," "about," "substantially," and similar terms are meant to cover minor variations in structure that may result from, for example, the manufacturing or assembly process and are intended to have a broad meaning in harmony with the common and accepted usage by those of ordinary skill in the art to which the subject matter of this disclosure pertains. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the figures. It should be noted that the orientation of various elements may differ according to other exemplary embodiments, and that such variations are intended to be encompassed by the present disclosure.

The hardware and data processing components used to implement the various processes, operations, illustrative logics, logical blocks, modules, and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems, and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the vehicle 10 and the systems and components thereof (e.g., the body 20, the operator controls 40, the driveline 50, the suspension system 60, the braking system 70, the sensors 90, the vehicle control system 100, etc.), the vehicle 210 and the systems and components thereof (e.g., the body 220, the operator controls 240, the driveline 250, the suspension system 260, the braking system 270, the sensors 290, the vehicle controller 300, etc.), the site monitoring and control system 400 and the systems and components thereof (e.g., the remote systems 440, the user portal 430, the user sensors 420, etc.), and the robotic system 500 and the systems and components thereof (e.g., the sensors 510, the interaction interface 520, the movement system 530, etc.) as shown in the various exemplary embodiments is illustrative only. Additionally, any element disclosed in one embodiment may be incorporated or utilized with any other embodiment disclosed herein.

The invention claimed is:

1. A robotic system comprising:

a movement system configured to move the robotic system between physical locations;

at least one interaction interface configured to physically interact with first operator controls of a first vehicle; and at least one processing circuit having at least one processor and at least one memory having instructions stored thereon that, when executed by the at least one processor, cause the at least one processor to:

receive a first command to perform a first task using the first vehicle;

acquire first vehicle information associated with the first vehicle via a wireless connection with at least one of the first vehicle or an external system;

determine how to operate the first vehicle using the first operator controls based on the first vehicle information;

engage the first operator controls using the at least one interaction interface to operate the first vehicle to perform the first task;

subsequent to controlling the first vehicle to perform the first task, receive a second command to perform a second task using a second vehicle having second operator controls;

acquire second vehicle information associated with the second vehicle via a wireless connection with at least one of the second vehicle, the external system, or another external system;

determine how to operate the second vehicle using the second operator controls based on the second vehicle information; and engage the second operator controls using the at least one interaction interface to operate the second vehicle to perform the second task;

wherein the second vehicle is a different type of vehicle than the first vehicle and at least one of the second operator controls functions differently than at least one of the first operator controls.

2. The robotic system of claim 1, wherein the instructions, when executed by the at least one processor, further cause the at least one processor to:

establish the wireless connection with the first vehicle via a short-range communication.

3. The robotic system of claim 1, wherein the instructions, when executed by the at least one processor, further cause the at least one processor to:

establish the wireless connection with the external system by at least one of scanning a code on the first vehicle, reading a radio frequency identification tag on the first vehicle, or receiving a near-field communication signal from a near-field communication device of the first vehicle.

4. The robotic system of claim 1, wherein the first vehicle information includes an operational constraint or an operational strategy associated with the first vehicle, and controlling the first vehicle based on the first vehicle information comprises controlling the first vehicle according to the operational constraint or the operational strategy.

5. The robotic system of claim 1, wherein the first vehicle information includes spatial information associated with the first vehicle, the spatial information including one or more of physical dimensions of the first vehicle, spatial reference points on the first vehicle, a safe mounting area on the first vehicle, an area to avoid on the first vehicle, or a location of a physically operable control on the first vehicle.

6. The robotic system of claim 5, wherein the first vehicle information further includes movement information associated with the first vehicle, the movement information including one or more of a location of a movable component on the first vehicle or a range of motion of the movable component on the first vehicle.

7. The robotic system of claim 6, wherein the instructions, when executed by the at least one processor, further cause the at least one processor to:

compare a physical dimension or a range of motion of a component of the robotic system to the spatial information and the movement information associated with the first vehicle; and determine that the robotic system is capable of physically controlling the first vehicle based on the comparison.

8. The robotic system of claim 6, wherein the instructions, when executed by the at least one processor, further cause the at least one processor to mount the first vehicle using the movement system based on the spatial information and the movement information associated with the first vehicle.

9. The robotic system of claim 1, wherein the at least one interaction interface comprises one or more of a robotic arm, a robotic hand, or a robotic grabber.

10. The robotic system of claim 1, wherein the instructions, when executed by the at least one processor, further cause the at least one processor to receive vehicle sensor data from the first vehicle, and wherein controlling the first vehicle is further performed based on the vehicle sensor data.

11. The robotic system of claim 1, wherein the robotic system is configured to be installed within or on the first vehicle.

12. The robotic system of claim 1, wherein the movement system comprises one or more of a robotic leg, a robotic foot, a wheel, a propeller, or a rotor system.

13. A method for autonomously operating a vehicle using a robotic system, the method comprising:

receiving, by a robotic system, a first command to perform a first task using a first vehicle having first operator controls;

acquiring, by the robotic system, first vehicle information associated with the first vehicle via a wireless connection with at least one of the first vehicle or an external system;

determining, by the robotic system, how to operate the first vehicle using the first operator controls based on the first vehicle information;

engaging, by the robotic system, the first operator controls using at least one interaction interface to operate the first vehicle to perform the first task;

subsequent to controlling the first vehicle to perform the first task, receiving, by the robotic system, a second command to perform a second task using a second vehicle having second operator controls;

acquiring, by the robotic system, second vehicle information associated with the second vehicle via a wireless connection with at least one of the second vehicle, the external system, or another external system;

determining, by the robotic system, how to operate the second vehicle using the second operator controls based on the second vehicle information; and engaging, by the robotic system, the second operator controls using the at least one interaction interface to operate the second vehicle to perform the second task, wherein the second vehicle is a different type of vehicle than the first vehicle and at least one of the second operator controls functions differently than at least one of the first operator controls.

14. The method of claim 13, wherein the at least one interaction interface comprises one or more of a robotic arm, a robotic hand, or a robotic grabber.

* * * * *